BEST AVAILABLE COPY
J. Prescott.
Cotton Gin.
No 210
A. I. Patented Nov. 30, 1858.
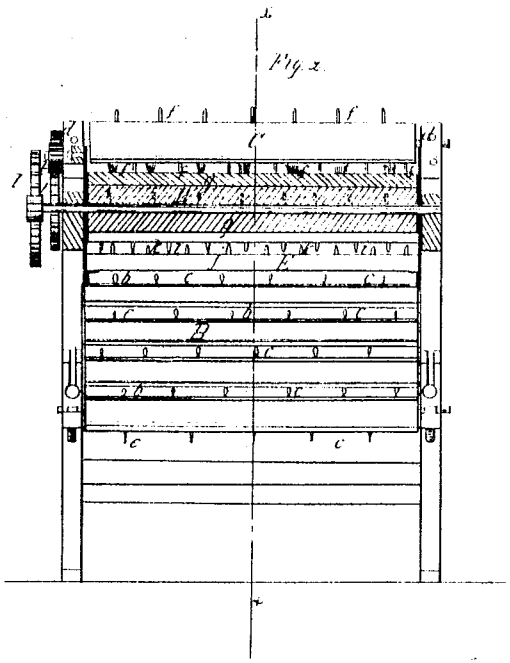
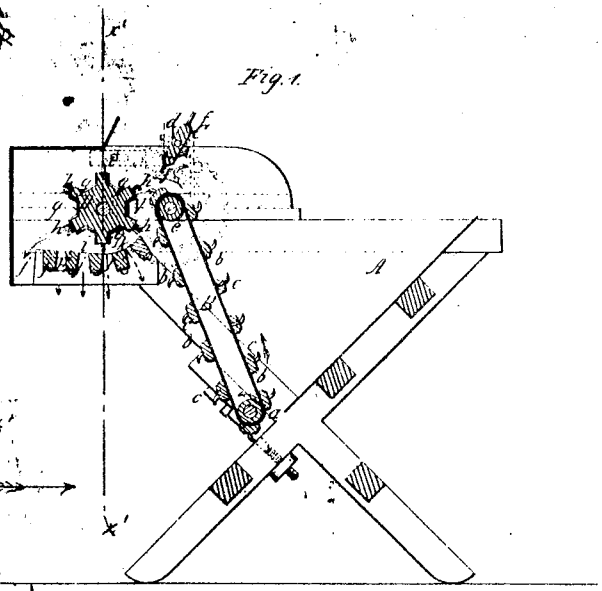
Witnesses:
Chas. V. Hill
Jesse P. Prescott
Inventor:
Jedediah Prescott
H. PETERS, PHOTO-LITHOGRAPHER, WASHINGTON, D. C.

BEST AVAILABLE COPY

A. S. No. 210, dated November 30, 1858.

*To all whom it may concern:*

Be it known that I, JEDEDIAH PRESCOTT, of Memphis, in the county of Shelby and State of Tennessee, have invented a new and Improved Feeding Device for Cotton-Gins: and I do hereby declare that the following is a full, clear, and exact description of the same, reference being had to the annexed drawings, making a part of this specification, in which—

Figure 1 is a vertical section of my invention, taken in the line *x x*, Fig. 2. Fig. 2 is also a vertical section of the same, taken in the line *x′ x′*, Fig. 1.

Similar letters of reference indicate corresponding parts in the two figures.

This invention relates to an improvement on a cotton-gin feeder for which Letters Patent bearing date October 13, 1857, were granted to me.

The object of the within-described invention is to accomplish in a more thorough manner the work performed by the patented case above alluded to—to wit, the feeding of the cotton in a very even manner to the gin, and at the same time separating dust and other foreign substances therefrom.

To enable those skilled in the art to fully understand and construct my invention, I will proceed to describe it.

A represents a hopper or box, in which an inclined endless apron, B, is placed, said apron forming one of the sides of the hopper, which is of V form, and has an opening, *a*, at its bottom, formed by allowing a space between the lower end of the apron and the opposite side of the box, as shown clearly in Fig. 1. The apron B may be constructed of any proper cloth, having transverse bars *b* attached at equal and suitable distances apart, the bars having curved or hooked teeth *c*, secured to or driven into them. On the upper part of the hopper A, and directly above the apron B, a flat retaining-bar, C, is placed, the journals of which are fitted in adjustable bearings *d*, attached to the frame of the box, the bearings *d* being capable of being adjusted vertically, so that the bar C may be brought nearer to or farther from the upper part of the apron when it passes over its upper roller, *e*, the bar C being parallel and in the same plane with the upper roller of the endless apron. In each edge of the bar C teeth *f* are placed, said teeth being of wire and projecting a suitable distance from the bar.

Directly back of the upper part of the apron B a cylinder, D, is placed. To this cylinder radial bars *g* attached to its periphery at equal distances apart. Two of the bars *g*, which are at opposite sides of the cylinder, are provided with teeth *h*, the other bars are provided with brushes *i*.

Just below the cylinder D a grating, E, is placed. This grating is formed of a series of bars, *j*, placed transversely in the frame. The grating is slightly concave, and one or more of its bars *j* may have vertical teeth *k* driven in it.

Power may be applied to one end of the shaft of cylinder D, and from the opposite end of said shaft motion may be transmitted to the roller *e* and bar C through the medium of suitable gearing, *l*. The operation will be readily seen: The hopper is filled with cotton as it is taken from the field, and motion being given the cylinder D the several working parts move in the direction as indicated by the red arrows in Fig. 1. The teeth *c* of the apron B convey the cotton upward, and as each bar passes over the top roller, *e*, of the apron the cotton is acted upon by the teeth *f* of the revolving bar C. These teeth throw from the apron B all surplus cotton, or they reduce the thickness of the layer which passes over the roller *e*, and the layer may be of greater or less thickness by adjusting the bearings *d*, so as to elevate the bar C at a greater or less distance above the apron B. The cotton is stripped from the teeth of apron B by the brushes *i* of the cylinder D, and the cotton is subjected to a second beating by the teeth *h* on cylinder D and the stationary teeth *k* of the grating E. The teeth *f* of the bar C loosen the fiber of the cotton and lighten up the mass and detaching the dirt as reducing the layer of cotton that passes over the roller *e*, and the teeth *k* finish the work, the light dirt being ejected upward from the box by the blast generated by the rotation of the cylinder D, the radial bars *g* serving the office of wings and the heavy dirt passing through the grating E. The cotton, in a clean, light, and even layer, passes over the ends of the grating into the hopper of the gin, which is so placed as to receive the cotton as it passes from the grating E. Should any heavy foreign substances be in the cotton when placed in the box A, they will pass out at *a*, as they cannot be carried upward.

I do not claim simply an endless toothed apron in connection with a revolving stripper, for these parts, in connection with stationary teeth or a comb, were formerly patented by me, as previously alluded to; but,

Having thus described my invention, what I claim as new, and desire to secure by Letters Patent, is—

The endless toothed apron B, revolving adjustable toothed bar C, rotary brush and toothed cylinder D, and grating E, combined and arranged substantially as and for the purpose set forth.

JEDEDIAH PRESCOTT.

Witnesses:

JAMES G. CAIRNS,

LEVI PRESCOTT.